United States Patent [19]

Crawford

[11] 4,413,553
[45] Nov. 8, 1983

[54] BALER

[75] Inventor: Alexander Crawford, Mississauga, Canada

[73] Assignee: Massey-Ferguson Industries Limited, Toronto, Canada

[21] Appl. No.: 295,881

[22] Filed: Aug. 24, 1981

[51] Int. Cl.³ .............................................. B65B 13/24
[52] U.S. Cl. .......................................... 100/4; 100/22; 100/80; 56/343
[58] Field of Search ..................... 56/343; 100/3, 5, 8, 100/17, 4, 18, 20, 21, 22, 23, 19 R, 80, 81

[56] References Cited

U.S. PATENT DOCUMENTS

| 648,039 | 4/1900 | Medlin | 100/80 |
|---|---|---|---|
| 2,612,099 | 9/1952 | McClellan | 100/4 |
| 2,822,749 | 2/1958 | Nolt | 100/4 X |
| 2,911,904 | 11/1959 | Weiss | 100/4 |
| 3,092,226 | 6/1963 | Williamson | 100/4 X |
| 3,254,911 | 6/1966 | Crawford | 100/22 X |
| 4,175,487 | 11/1979 | Molitorisz | 100/80 X |
| 4,270,446 | 6/1981 | Molitorisz | 100/81 X |

*Primary Examiner*—Billy J. Wilhite
*Attorney, Agent, or Firm*—John C. Thompson

[57] ABSTRACT

An apparatus for coordinating the operation of the bale tying mechanism with the feeding apparatus of a baler. The baler (10) includes a bale chamber (16), feeding means (26) including a pair of feed rollers (36) which are moved back and forth across the inlet end by reciprocating means (46, 48) including a hydraulic cylinder. The bale tying means includes a knotter (64), a pickup needle (110), and a knotter shaft (76) capable of driving the knotter and the needle. The actuating means which is capable of actuating the bale tying means includes a bale length metering mechanism (202 to 218), a constantly driven sprocket (230), and a single revolution clutch (220), the actuating means being capable of initiating the operation of the clutch (220) to cause rotation of the knotter shaft (76) when the bale length has been achieved. The coordinating apparatus of this invention which is capable of preventing the operation of clutch (220), except when the pair of rollers (36) have been reciprocated to their desired position, includes a bell crank (238) and a slidable link (236), both normally spring biased to a stop position but capable when one end of the bell crank is engaged by the reciprocating means to enable operation of the single revolution clutch (220).

5 Claims, 5 Drawing Figures

BALER

FIELD OF THE INVENTION

The present invention relates generally to balers of the type which may be used for baling agricultural crops, and more particularly to an apparatus for coordinating the initiation of a bale tying mechanism with the operation of reciprocal feeding means. The present invention may be utilized in a baler of the type having feeding means which are reciprocated by a hydraulic motor, the feeding means which may be a pair of rollers which are moved back and forth across the inlet end of the bale chamber, the baler further having an actuating mechanism for a bale tying mechanism which is driven independently of the feeding means.

BACKGROUND OF THE INVENTION

Many forms of balers are well known today. The most commonly used field baler of today forms a rectangular bale by picking up crop material by means of a crop pickup, transferring the crop material laterally by means of packer fingers to the forward end of a bale chamber, and then compressing the crop material into a bale within the bale chamber by means of a plunger. The baler also includes a bale tying mechanism including a needle and knotter, the needle and knotter being driven through a single revolution clutch from a constantly running member whose rotational movement is coordinated with the movement of the plunger through a mechanical drive. The baler further includes a metering mechanism which measures the length of the bale being formed and initiates operation of the tying mechanism through a single revolution clutch of the dog type, the dog engaging a cam on the constantly running member whose rotation is coordinated with the movement of the plunger by mechanical drive means in the form of chains or the like.

While this form of baler has achieved wide spread commercial success in the past, high peak loads are encountered during the operation of the baler which require relatively heavy drive train components. Since the prior art balers are customarily drawn by a tractor it is common practice to drive the baler from the tractor power take-off. It has been proposed in a related patent application to feed the crop material into the bale case on the baler by means of a pair of reciprocated rollers which are moved back and forth across the inlet end of the bale chamber. This form of construction substantially simplifies the drive of a baler since high peak torques are minimized, thus permitting the utilization of the hydraulic power readily available on the propelling tractor. Since hydraulic power may be utilized to operate the feeding means, it is also desirable to utilize hydraulic power for the operation of the bale tying mechanism, thus eliminating mechanical drive line components between the tractor and the baler. However, it should be appreciated that if the operation of the feeding mechanism and the tying mechanism are not timed with respect to each other, that the baler will not perform in a satisfactory manner. In addition, it is not possible to achieve coordination of two hydraulic motors which are not mechanically interconnected with each other through the operation of a fluid circuit per se.

OBJECTS AND SUMMARY OF THE PRESENT INVENTION

In general, it is an object of this invention to provide a novel apparatus for coordinating the actuation of a bale tying mechanism with the feeding means for the baler wherein either the feeding means or the actuating mechanism or both are hydraulically driven.

More specifically, it is an object of this invention to provide a baler, of the type utilizing a pair of feed rollers which are reciprocated back and forth across the inlet end of a bale chamber by hydraulic cylinders, with means to coordinate the initiation of the operation of the bale tying mechanism with the movement of said pair of rollers to ensure that the tying cycle does not begin until both the proper bale length has been achieved and the rollers are in their proper operative position for the initiation of the tying cycle.

The above objects and other objects and advantages of this invention will be apparent from the following detailed description taken in conjunction with the accompanying drawings in which a preferred form of this invention is illustrated.

DESCRIPTION OF A PREFERRED EMBODIMENT

Figure 1:
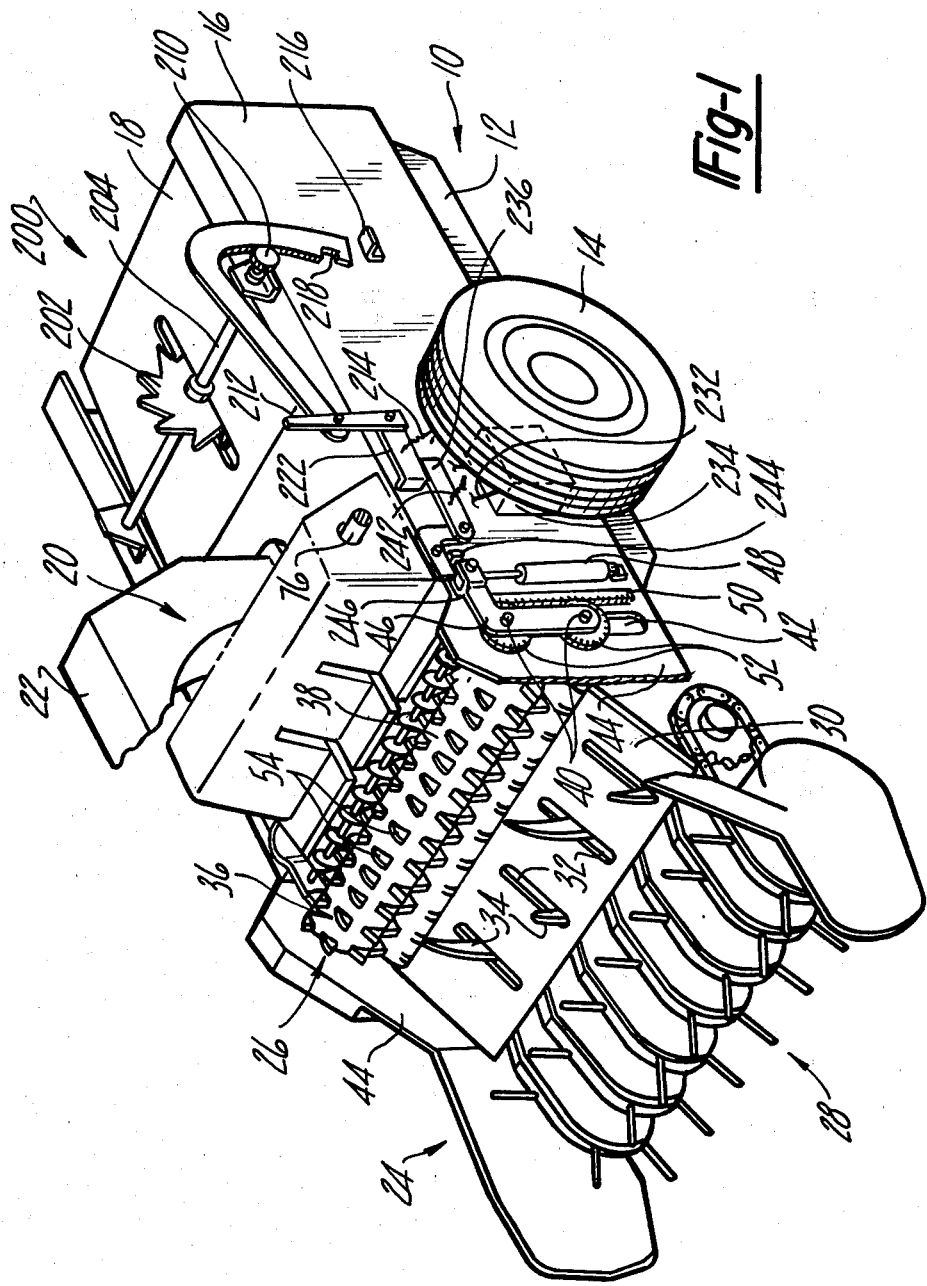
FIG. 1 is a perspective view of a baler in which the principles of the present invention are incorporated.

Referring first to FIG. 1, the baler in which the principles of this invention are incorporated is indicated generally at 10. The baler includes a frame 12 to which are secured ground engaging wheels 14. Mounted on the frame 12 is a bale chamber or bale case 16, the bale chamber being provided with a generally conventional tension rail mechanism 18. Two or more knotters with associated twine pickup needles are mounted at the forward upper end of the bale chamber generally in the space indicated by reference numeral 20. A forwardly extending tongue 22 is secured to the baler 10, the forward end of the tongue normally being secured to the drawbar of a tractor when the baler is in operation. The baler is also provided with conveying means, indicated generally at 24, and feeding means, indicated generally at 26, the feeding means being disposed between the conveying means and inlet end of the bale chamber 16.

In the embodiment illustrated in FIG. 1 the conveying means includes a crop pickup indicated generally at 28, and a platform 30 over which a mat of crop material may be conveyed. To this end the platform 30 is provided with longitudinal slots 32 through which packer fingers or tines 34 project, the packer fingers moving in a clockwise orbital path when viewed from the left hand side of the machine to convey the mat of crop material rearwardly into the bite of a pair of feed rollers 36 which form part of the feeding means. Each of the feed rollers includes a cylindrical section 38 supported by concentric right and left hand spaced apart stub shafts 40 (only the left hand stub shafts 40 being shown in FIG. 1). The stub shafts project through vertically extending slots 42 formed in the right and left forward side walls 44. Reciprocating means are provided to move the pair of feed rollers between first and second positions. To this end, each of the stub shafts 40 are journalled within a command support 46 which can be moved upwardly and downwardly by means of a hydraulic cylinder 48. Although not shown, it should be noted that the right hand stub shafts are also supported by a common support and are also moved upwardly and downwardly by a corresponding hydraulic cylinder, the right and left hand hydraulic cylinders 48 working in unison. During the movement of the rollers 36 back and forth across the inlet end of the bale chamber 16 rotational movement is imparted to the rollers by a rack 50 and pinions 52. The feed rollers 36 are provided with a plurality of saw tooth like elements 54 which cause the mat of crop material conveyed to the feeding mechanism to be fed into the baler as the rollers are moved back and forth across the inlet end of the bale chamber. As the subject matter of the feed mechanism and other components of the bale illustrated in FIG. 1 are the subject of another patent application they will not be described in further detail.

Figure 3:
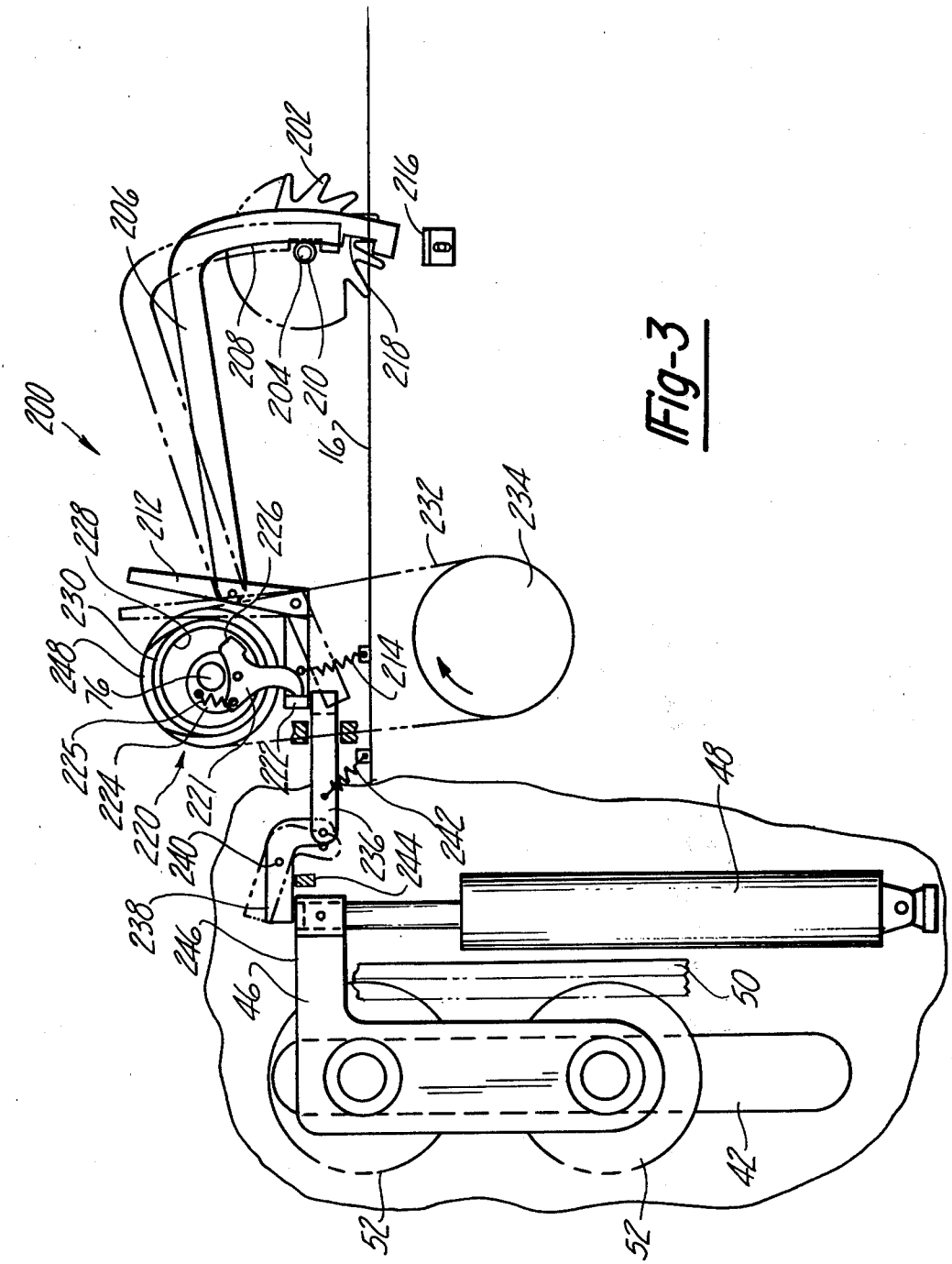
FIG. 3 is a side view of the actuating and coordinating means which are used to initiate operation of the knotter and the twine pickup needles at the proper time.
Figure 4:
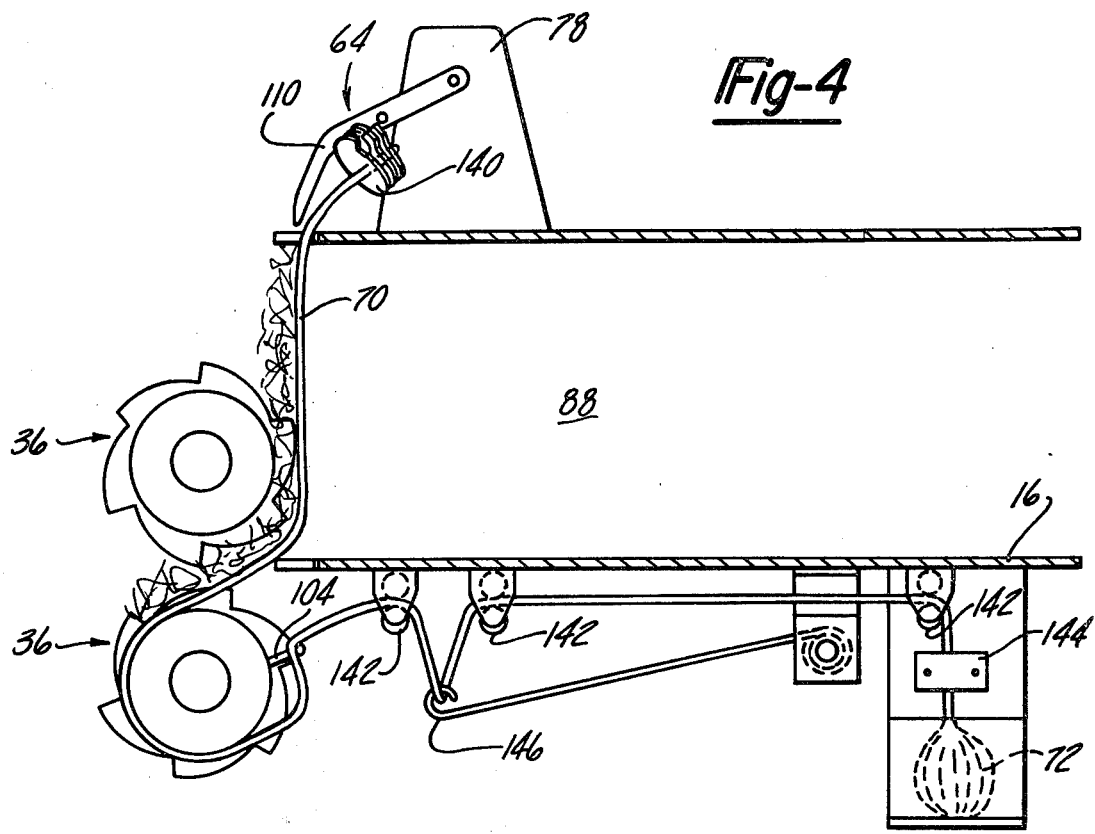
FIGS. 4 and 5 are somewhat schematic illustrations showing initial and ending stages of the formation of a bale.
Figure 5:
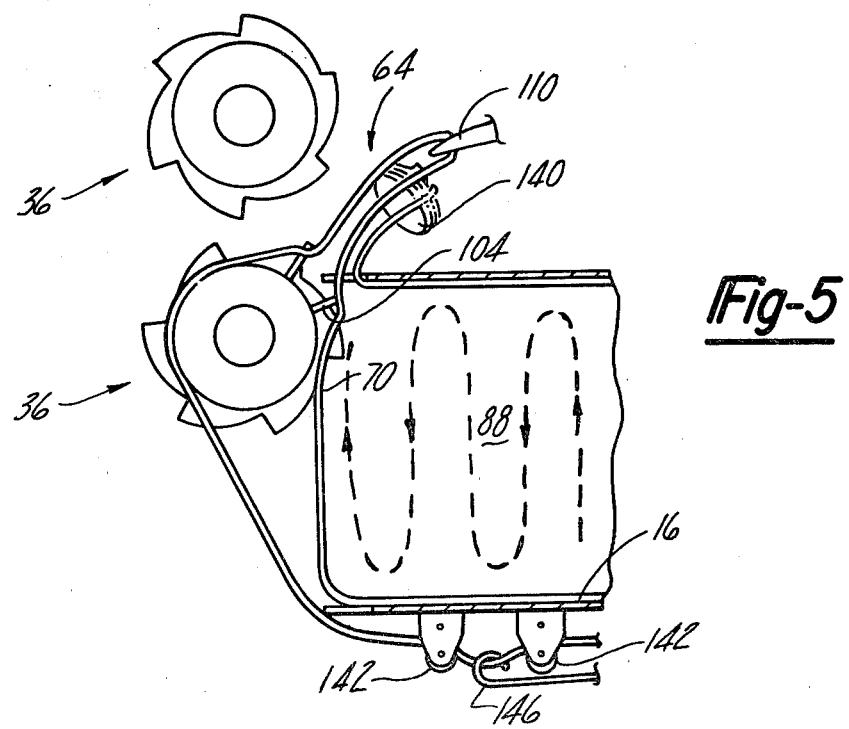

Reference will now be made to FIGS. 4 and 5 which discloses in general a baling cycle. The knotter 64 shown in these figures and represented only by the twine disks 140 (and also by the bill hook 141 in FIG. 2) is the type illustrated in U.S. Pat. No. 3,254,911, is incorporated herein by reference thereto. As cut crop material is picked up from the ground, it is fed into the inlet of the baling chamber 16, and successive layers of material are compressed into bales by the feed rollers 36 which also advance the bales along the chamber towards the outlet, to the right in these figures. A portion or length 70 of twine extends across the baling chamber in the path of the leading end of each bale, this portion 70 being called the primary twine. Initially it extends from a supply reel or container 72, with the end of the primary twine being held by the twine disks 140, which are spaced above the top wall of the bale chambe 16. The knotting mechanism 64 is driven by a knotter shaft 76 (FIG. 3) which is rotatably journalled in a support frame 78. The shaft 76 is intermittently caused to be rotated by an actuating and coordinating mechanism 200 which will be more fully described below. The bale tying means also includes, in addition to the knotter 64 and knotter shaft 76, a pickup needle 110. When the desired bale length has been achieved, as shown in FIG. 5, the knotter shaft 76 is caused to be rotated and the twine pickup needle 110 moves from the dwell or at rest position (shown in FIG. 4) to the full throw position (shown in FIG. 2) to pick up the twine, and then to the raised position (shown in FIG. 5) to wrap the twine around the trailing end of the bale 88 and place the portion 90 of the twine in the knotting mechanism 64. (The portion 90 of the twine which is carried past the trailing end of the bale is called the secondary twine.) During the operation of the knotting mechanism 64 the twine is cut and a knot is formed between the primary and secondary end portions of the twine. In addition, the cut portion is retained by the knotter 64 leaving a new primary portion extending across the path of the succeeding bale to be formed. At the completion of the cycle the needle returns to its dwell position.

As previously noted each of the feed rollers 36 is provided with a plurality of saw tooth like feed elements 54. As can best be seen in FIG. 1 the saw tooth like feed elements 54 are in a plurality of spaced apart arrays which extend generally perpendicular to the axis of the cylindrical section 38. For each knotter a secondary twine supporting mechanism, indicated generally at 100, is provided on the roller spaced furthest away from the knotters, the secondary twine supporting mechanism being disposed between two adjacent arrays of saw tooth like feed elements. To this end, side extensions 102 are provided, the side extensions lying in the same plane as the associated saw tooth like feed elements 54. An apertured twine carrier plate 104 is welded or otherwise rigidly secured between adjacent side extensions 102. A support member 106 is also rigidly secured between the extensions 102. Carried on the support member 106 as well as upon that portion of the cylindrical section 38 which extends between the support member 106 and the carrier plate 104 are outwardly extending parallel spaced apart twine channel defining members 108. The foregoing structure carries the secondary portion of the twine, and it can be seen that the portion of the secondary twine which extends between the aperture in plate 104 and the end of the twine channel defining members 108 carried by support member 106 is spaced away from the adjacent surface of the cylindrical section 38.

Figure 2:
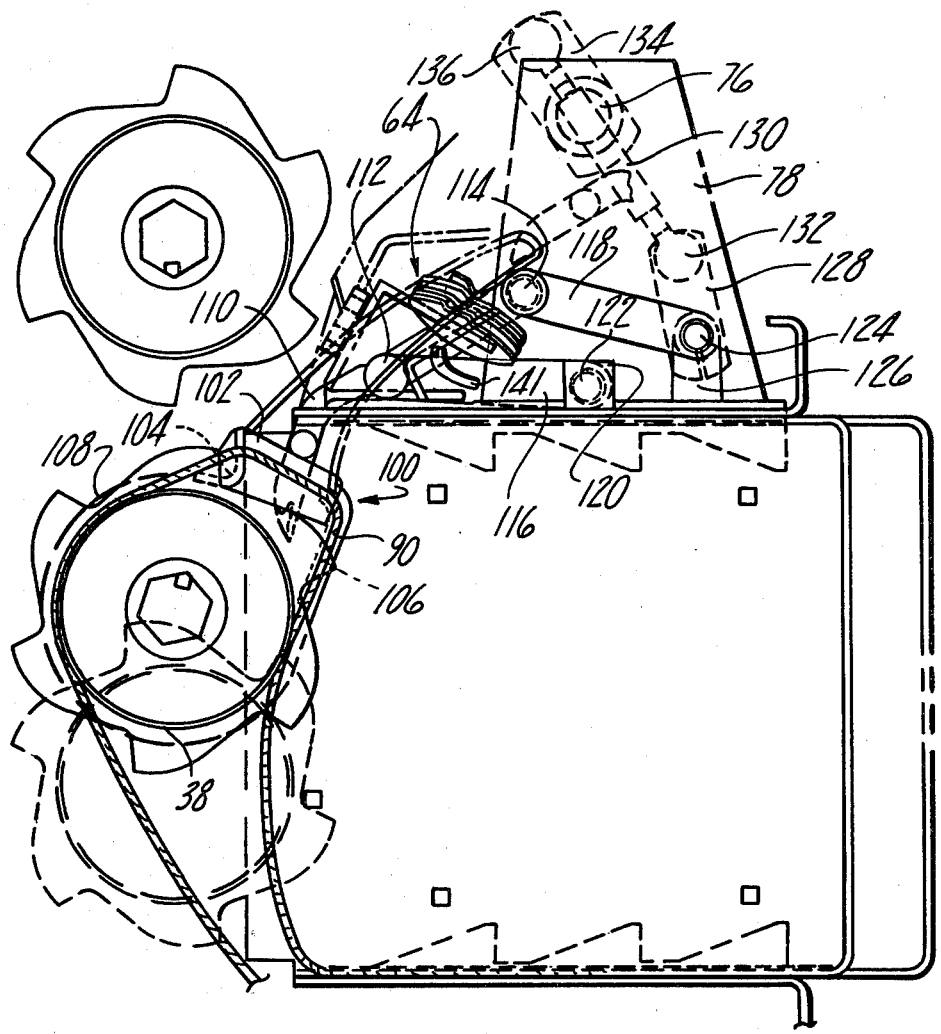
FIG. 2 is a section through a portion of the baler shown in FIG. 1 illustrating the twine pickup needle in that position it occupies when picking up the twine from the roller, and also illustrating a portion of the knotter.

That portion of the secondary twine which extends between the carrier plate 104 and the ends of the twine channel defining members 108 carried by the support member 106 can be engaged by a pickup needle 110. The mechanism which supports the pickup needle 110 is best shown in FIG. 2. Thus, each of the twine pickup needles 110 (there being one pickup needle for each knotter) is pivotally interconnected by pivots 112 and 114 with forward and rear links 116, 118, respectively. The rear end of each of the forward links interconnected with a bracket 120 mounted on the top of the bale case 16 by pivot pin 122. The rear end of each of the rear links 118 is nonrotatably secured to a cross shaft 124 rotatably journalled in brackets 126, also secured to the top of the bale case 16. One end of the cross shaft 124 carries an arm 128. This arm is in turn pivotally interconnected with a drive link 130 by pivot 132, the other end of the drive link being interconnected with arm 134 by pivot 136. One end of the arm (remote from the pivot 136) is secured to the knotter shaft 76 and is caused to rotate therewith.

Tensioning means are provided to maintain proper tension of the twine during knotting. Thus, the twine extending away from the supply ball 72 pass through guides 142, and a twine brake or drag 144 is disposed between one guide 142 and the supply 72. In addition, there is also a spring mounted pigtail type tensioning device 146 interposed between two other guides 142. The guides 142 and the tensioning means 144, 146 are all mounted on a lower surface of the bale case 16.

The actuating and coordinating mechanism 200 (FIG. 3) includes an actuating mechanism capable of causing a single revolution of the knotter shaft 76 when the proper bale length has been achieved, and a coordinating mechanism capable of preventing initiation of rotation of the knotter shaft except when the pair of rollers have been reciprocated to their upper or first position. The actuating mechanism includes a bale length metering mechanism and a single revolution clutch. The metering mechanism includes a metering wheel 202 fixed on a rotatable shaft 204. A metering arm 206, disposed to one side of the bale case 16 (preferable the left side), is provided with a curved surface 208 which is engaged by a knurled roller 210 mounted on the shaft 204. The forward end of the arm 206 is pivotally secured to a bell crank 212, which is in turn pivotally mounted on the bale case, the crank 212 being biased in a counterclockwise direction by spring 214. The arm 206 is raised as the bale 88 engages the wheel 202 and causes the wheel and shaft 204 to be rotated, until the proper length, determined by stop 216, is achieved. At this point the arm 206 can be pulled forwardly by the action of spring 214 as the cutout 218 in the arm 206 is lined up with the shaft 204 and the knurled roller 210. A single revolution clutch 220 can be engaged if the bell crank rotates from its full line position shown in FIG. 3 to its dotted line position. The clutch 220 includes a dog 221, one end of the dog normally engaging the stop 222 on bell crank 212. The dog 221 is pivotally mounted on the collar 224 which is in turn fixed to the knotter shaft 76. When the one end of the dog is released, a spring 225 will bias the dog 221 in a clockwise direction to bring the pawl 226 into engagement with the cooperating surface 228 of the knotter drive sprocket 230. The knotter drive sprocket is journalled on knotter shaft 76 and is constantly driven by chain 232. After a single revolution the end of the dog 221 will again be engaged by stop 222 to disengage the pawl.

The actuating mechanism described so far can be considered generally conventional. In prior art balers which utilize a plunger to feed material into the bale case 16 the needle actuating mechanism is interconnected with the collar 224, and the movement of the needle, plunger and knotter are all coordinated by mechanical drives, such as for example chain 232. While the disclosed pickup needle and knotter actuating mechanism is interconnected with the collar 224 through the knotter shaft 76, in view of the hydraulic actuation of the feed rollers 36 it is necessary to provide additional means to coordinate the movement of the feeding means 26 with the actuation of the pickup needles. In this regard it should be noted that there is no mechanical drive between the feeding means 26 and the sprocket 230, as the feeding means 26 is driven by hydraulic cylinders 48 and the sprocket 230 is driven by a continuously driven hydraulic motor 234 through chains 232.

The means to coordinate the movement of the pickup needles (as well as the knotter) with the feeding means includes a slidable link 236, and a bell crank 238 pivotally mounted on the baler by pivot pin 240. One end of link 236 is pivotally interconnected with one end of the crank 238 and spring 242 normally biases the link 236 to its rear (or stop) position (shown in full lines) and the crank 238 to its stop (or full line) position where it normally contacts stop 244. Every time the cylinders 48 raise the common supports 46 to their fully raised position the top rear top surface 246 of the left hand common support will contact the crank 238 to cause it to rotate from its normal full line position to its raised dotted line position. This movement of the crank 238 will cause the link 236 to move forwardly permitting the bell crank 212, under the action of spring 214, to rotate in its dotted line position, releasing dog 221 which will then initiate movement of the collar 224. Once the dog 221 clears stop 222 a cam lobe 248 on the collar will reset the bell crank 212 permitting arm 206 to drop to its stop position. It should be understood that although bell crank 212 is free to release dog 221 every time the support 46 reaches its uppermost position, that the crank 212 will only be free to move to its dotted line position when the proper length of the bale 88 has been achieved.

While a preferred structure in which the principle of this invention have been incorporated is shown and described above, it is to be understood that the invention is not limited to the particular details shown and described above, but that, in fact, widely different means may be employed in the practice of the broader aspects of this invention.

What is claimed is:

1. A baler comprising:
a bale chamber having an inlet end;
feeding means including a pair of feed rollers capable of feeding crop material into the bale chamber;
reciprocatng means including a hydraulic cylinder capable of reciprocating the pair of feed rollers between first and second positions across the inlet end of the bale chamber;
bale tying means carried by the bale chamber, the bale tying means including a knotter, a pickup needle capable of bringing twine to the knotter, and a knotter shaft interconnected with the knotter and needle;
actuating means capable of actuating the bale tying means including a bale length metering mechanism, a sprocket constantly driven by a hydraulic motor, and a single revolution clutch interconnecting the sprocket with the knotter shaft, the bale length metering mechanism being interconnected with said single revolution clutch and capable of initiating operation of the clutch to cause rotation of the knotter shaft when the proper bale length has been achieved; and
coordinating means capable of preventing operation of the clutch except when the pair of rollers have been reciprocated to said first position.

2. A baler comprising:
a bale chamber having an inlet end;
feeding means capable of feeding crop material into the bale chamber;
reciprocatng means capable of reciprocating the feeding means between first and second positions transversely across the inlet end of the bale chamber;
bale tying means carried by the bale chamber, the bale tying means including a knotter on one side of the bale chamber, a needle capable of bringing twine to the knotter, and a knotter shaft interconnected with the knotter and needle;
actuating means capable of actuating the bale tying means including a constantly driven rotatable member, a bale length metering mechanism, and a clutch interconnecting the rotatable member with the knotter shaft, the bale length metering mechanism being interconnected with said clutch and capable of initiating operation of the clutch when the proper bale length has been achieved; and
coordinating means capable of preventing operation of the clutch except when the feeding means has been reciprocated to said first position.

3. A baler comprising:
a bale chamber having an inlet end;
feeding means including a pair of feed rollers capable of feeding crop material into the bale chamber;

reciprocating means capable of reciprocating the pair of feed rollers between first and second positions across the inlet end of the bale chamber;

bale tying means carried by the bale chamber, the bale tying means including a knotter, a pickup needle capable of bringing twine to the knotter, and a knotter shaft interconnected with the knotter and needle;

actuating means capable of actuating the bale tying means including a bale length metering mechanism, a constantly driven sprocket, and a single revolution clutch interconnecting the sprocket with the knotter shaft, the bale length metering mechanism being interconnected with said single revolution clutch and capable of initiating operation of the clutch to cause rotation of the knotter shaft when the proper bale length has been achieved; and coordinating means capable of preventing operation of the clutch except when the pair of rollers have been reciprocated to said first position.

4. The baler as set forth in claim 2 wherein the feeding means is reciprocated back and forth across the face of the bale chamber between a first position adjacent the knotter and a second position spaced away from the knotter.

5. The baler as set forth in either claim 1, 2 or 3 wherein the coordinating means includes a bell crank pivotally mounted on the bale chamber, and a slidable link one end of which is pivotally interconnected with one end of the bell crank, the bell crank and slidable link normally being spring biased to a biased position wherein the other end of the slidable link is in contact with the actuating means and capable of preventing operation of the clutch, the other end of the bell crank being engageable by the reciprocating means as the feeding means approaches the first position to cause the bell crank and slidable link to be moved away from the biased position enabling operation of the clutch.

* * * * *